(12) United States Patent
Xiong et al.

(10) Patent No.: US 11,792,486 B2
(45) Date of Patent: Oct. 17, 2023

(54) INTERFACE GENERATION USING COLLECTION POOLS

(71) Applicant: HULU, LLC, Santa Monica, CA (US)

(72) Inventors: Andre Xiong, Los Angeles, CA (US); Darshana Umakanth, Culver City, CA (US); Yuchong Luo, Beijing (CN); Brian T. Morrison, Burien, WA (US); Lena Bareket, Culver City, CA (US); Huimin Chen, Los Angeles, CA (US); Carlos Sandoval, Los Angeles, CA (US); Brian Burkhart, Seattle, WA (US); David Jung, Seattle, WA (US); Brandon Lonac, Edmonds, WA (US); Bo Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 52 days.

(21) Appl. No.: 17/497,224

(22) Filed: Oct. 8, 2021

(65) Prior Publication Data

US 2023/0114158 A1    Apr. 13, 2023

(51) Int. Cl.
*H04N 21/482* (2011.01)
*H04N 21/437* (2011.01)

(52) U.S. Cl.
CPC .............. *H04N 21/4826* (2013.01); *H04N 21/437* (2013.01)

(58) Field of Classification Search
CPC ................ H04N 21/4826; H04N 21/437
See application file for complete search history.

(56) References Cited

U.S. PATENT DOCUMENTS

| | | | | |
|---|---|---|---|---|
| 2009/0144635 A1* | 6/2009 | Miyazaki et al. | ..... | G06F 16/433 715/747 |
| 2011/0131180 A1* | 6/2011 | Tuli et al. | ............ | G06F 16/972 707/610 |
| 2015/0106718 A1* | 4/2015 | Boulter et al. | ......... | H04L 67/02 715/716 |
| 2019/0026313 A1* | 1/2019 | Zhang et al. | ....... | G06F 16/5854 |

* cited by examiner

*Primary Examiner* — James R Marandi
(74) *Attorney, Agent, or Firm* — Kwan & Olynick LLP

(57) ABSTRACT

In some embodiments, a method receives a request for an interface. A configuration for the interface includes a plurality of slots that are associated with a plurality of collection pools, wherein each collection pool is configurable with a ranking strategy. The method determines a collection pool for a slot in the interface where the collection pool is associated with a plurality of collections. A collection is received for the slot. The collection is determined by ranking the plurality of collections using a ranking strategy for the collection pool to generate a ranking of the plurality of collections. The method outputs the collection for the collection pool for display in the slot of the interface.

20 Claims, 11 Drawing Sheets

User interface
112

Highest ranked collection for collection pool #1
502-1

Highest ranked collection for collection pool #2
502-2

Second highest ranked collection for collection pool #1
502-3

Fixed collection #1
502-4

Highest ranked collection for collection pool #3
502-5

FIG. 7

INTERFACE GENERATION USING COLLECTION POOLS

BACKGROUND

A video delivery system may provide an interface to display items for browsing by a user account (e.g., by a user). The items may include videos that can be selected for playback. Other items may also be displayed, such as promotions, advertisements, etc. The display of the items in the interface may be important because displaying more items that are relevant to the user account may increase the interaction for the items. That is, it may be more likely that a selection from a user account is received to play back a video when a user of the user account can find something of interest to play. However, the number of items that can be displayed in the interface may be very large, which makes the organization of the items difficult. In some examples, a single ranking strategy may be used to rank the items for display in the interface. However, this may not provide flexibility when displaying different categories of items.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 7 depicts an example of the user interface according to some embodiments.

DETAILED DESCRIPTION

Described herein are techniques for an interface generation system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system may organize items into categories, which may be referred to as collections. The items in a collection may be organized based on an attribute, such as recently watched videos. In some embodiments, an interface may display a collection in a slot of the interface. For example, a slot may be a row in the interface, but other configurations of a slot may exist, such as columns or other types of sections in the interface. There may be many collections that can be displayed in the interface. The video delivery system may use collection pools that allow personalization of which collections may be displayed in the slots.

A collection pool may be associated with a portion of the available collections. The collections for the collection pool may be eligible to be displayed in the interface when the collection pool is associated with a slot in the interface. Also, the collection pools may be associated with a ranking strategy that can be applied to each collection pool independent of the collections that it contains. This improves upon a single ranking strategy that may have been used for all collections by tailoring a ranking strategy to the portion of collections. To associate collections to the collection pools, the collections may be enhanced with metadata that may indicate one or more collection pools in which the collection is associated. When a collection pool is assigned to a slot on the interface, a recommendation system may use the ranking strategy of the collection pool to rank the collections that have been associated with the collection pool. In some embodiments, the highest ranked collection may be returned for the collection pool and can be displayed in the slot of the interface.

The use of collection pools may improve the personalization of the interface and improve the relevancy of content that is displayed in the interface. For example, the use of different ranking strategies and the association of different collections to the respective collection pools may make the ranking of items more efficient and faster. Accordingly, the recommendation system can rank a subset of collections that are available using a more relevant ranking strategy that is designed to rank the collections for the collection pool.

System Overview

Figure 1:
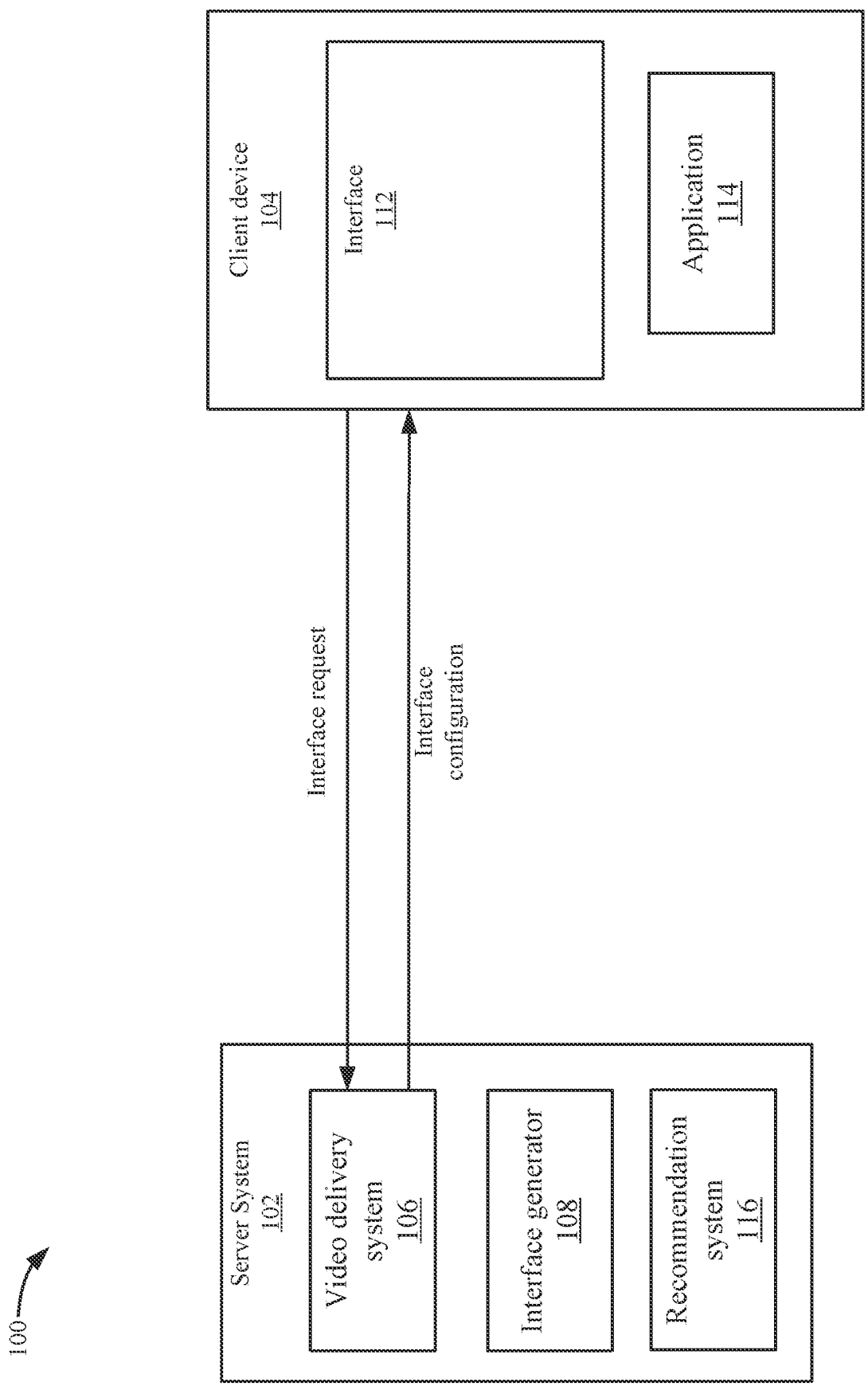
FIG. 1 depicts a simplified system for generating an interface using collection pools according to some embodiments.

FIG. 1 depicts a simplified system 100 for generating an interface using collection pools according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be content that is requested by a user account associated with client device 104. For example, a user account may request a movie, an episode of a show, etc. Although videos are described, it will be understood that other content may also be delivered, such as a website, page of content, etc.

Client device 104 may be a computing device, such as a smartphone, living room device, personal computer, tablet, television, set-top box, etc. Client device 104 may include an interface 112 that may display content, such as a library of videos may be recommended for browsing. Also, a media player may play back a video that is requested from video delivery system 106. A user account may use client device 104 and may be associated with video delivery system 106 (e.g., the user account signs up for the service). A user that is associated with the user account may use client device 104.

Although multiple client devices 104 are not shown, video delivery system 106 may receive multiple requests from multiple client devices 104. Client devices 104 may send requests for content to video delivery system 106. For example, the requests may be for playback of different content, such as different videos.

Application 114 may display an instance of interface 112 on client device 104. Application 114 may also perform other functions, such as providing a media player that can play back a video in interface 112.

Interface 112 may be displayed on client device 104 in a display. Interface 112 may allow a user account to browse different items. While browsing, the items may be selected by the user account and an action is performed, such as a video may be selected and played. Then, playback of the video may be enabled in interface 112, or other actions may be performed, such as displaying additional details for the selected video. In some embodiments, interface 112 may display recommendations that may recommend different items, such as different instances of content. For example, the content may be videos offered by video delivery system 106. However, other recommendations may be appreciated, such as display advertisements, promotions, non-video content, such as webpages, etc.

In some examples, application 114 generates an instance of interface 112 using the recommendations. For example, video delivery system 106 may receive an interface request from client device 104. The interface request may request information for display of at least a portion of interface 112. For example, when a user account logs onto the video delivery system, or as a user account is browsing interface 112, application 114 may send a request for content to display in interface 112. Interface generator 108 may determine information to generate an interface 112 at client device 104. As will be discussed in more detail below, interface generator 108 may determine collections that should be displayed in slots in interface 112. Video delivery system 106 may send back an interface configuration to specify the content, such as the collections, to application 114 for display in interface 112. Video delivery system 106 may provide the interface configuration back to client 104 for display on interface 112 within a certain amount of time, such as a time defined by a threshold. Generally, in an online environment, the time to determine the recommendations is very short and recommendations should be generated in a time taken to generate a display of the interface, which may include information other than the recommendations.

A recommendation system 116 may generate the recommendations. To improve the recommendation process, recommendation system 116 may designate collection pools that are associated with a portion of available collections for video delivery system 106. Less collections may be ranked to generate recommendations faster and more efficiently. Also, each collection pool may be associated with a ranking strategy that can be applied independently of the collections that each collection pool contains and independently of other ranking strategies for other collection pools.

Collection pools may be associated with slots in a configuration for interface 112. When a collection pool is encountered in a slot in interface 112, a collection may be inserted in the slot. To select a collection for a collection pool, interface generator 108 may send an identifier for the collection pool to recommendation system 116. Recommendation system 116 may use the collection pool identifier to identify collections that are associated with each collection pool. Recommendation system 116 may retrieve collections that have metadata associating each collection with the collection pool. Then, recommendation system 116 may determine a ranking strategy for each respective collection poo and may rank the collections. By retrieving a subset of the collections in the eligible list of collections, recommendation system 116 may generate recommendations faster because less collections may need to be analyzed. Also, by removing some collections from the ranking process, the recommendations may be more relevant to the user account because some collections that may not be relevant are not eligible to be ranked for the collection pool. This may provide more focused results for the collection pool. Also, an individual collection may be ranked differently depending on which of the associated collection pools is being used because different collection pools may use different ranking strategies. That is, the use of collections pools allows the ranking to be applied differently, such as ranking each collection based on how recent the user account has watched items in the collection or ranking each collection based on other videos that have been watched. The selection of the collection for a collection pool will be discussed in more detail below. After selecting the collections, recommendation system 116 may return the collections for the requested collection pools to interface generator 108. Video delivery system 106 may then return an interface configuration that specifies the collections to display on interface 112 to application 114.

Previously, the same ranking strategy may have been applied to all slots and specific targeted collections could not be displayed in a slot. For example, slots may only have been able to display the X highest ranked collections for a user account. However, using collection pools, slots may be configured with collection pools that apply different ranking strategies for different portions of collections. Although portions of collections are described, a collection pool may also rank all collections with a specified ranking strategy.

The following will now describe the initialization of the collection pools, and then the generation of the interface using the collection pools.

Collection Pool Initialization

Figure 2:
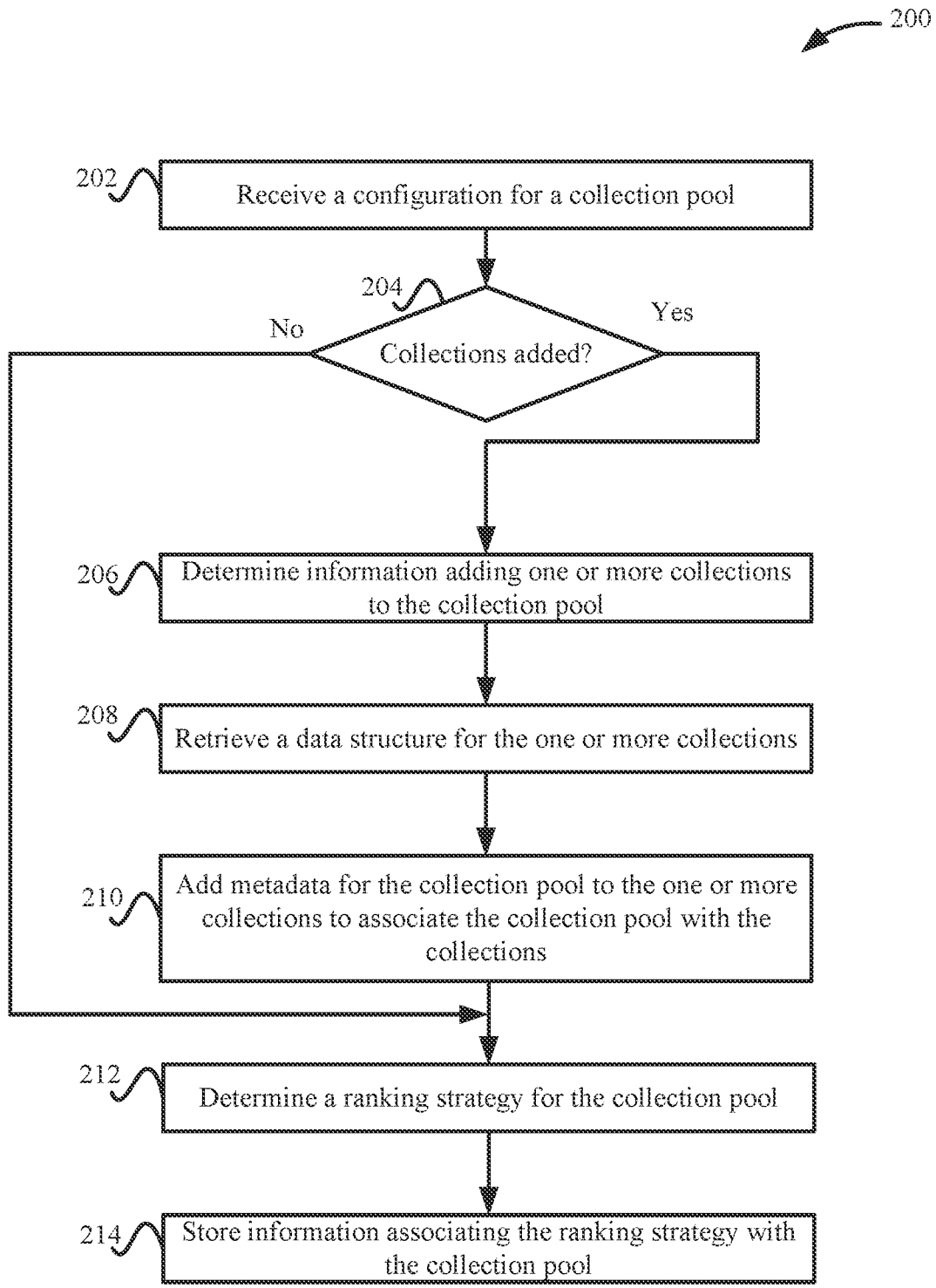
FIG. 2 depicts a simplified flowchart of a method for initializing a collection pool according to some embodiments.

FIG. 2 depicts a simplified flowchart 200 of a method for initializing a collection pool according to some embodiments. At 202, interface generator 108 receives a configuration for a collection pool. The configuration may initialize a new collection pool. Also, the configuration may update an already-configured collection pool.

At 204, interface generator 108 determines if collections have been added to the collection pool. For example, collections that are associated with this specific collection pool may be specified explicitly in the collection pool configuration.

If collections have been added, at 206, interface generator 108 determines information to add the one or more collections to the collection pool. For example, the information may include an identifier for the collection that uniquely identifies the collection from other collections. The collection pool configuration may include identifiers for a collection #1, a collection #2, etc. as being added to the collection pool. Other information may also be determined, such as a title for the collection, an internal title, and a status. The title of the collection may be the title that is displayed on interface 112; the internal title may be the title that is used internally at video delivery system 106; and the status may indicate whether the collection has been published or is eligible to be displayed on interface 112.

At 208, interface generator 108 retrieves a data structure for the one or more collections. For example, each collection may be stored in storage with information that defines the collection, such as the items that are included in the collection. At 210, interface generator 108 adds metadata for the collection pool to the one or more collections to associate the collection pool with the respective collections. In some embodiments, the data structure may include a field in which information can be inserted to identify a collection pool to which a respective collection belongs. In this case, if the collection pool has an identifier of collection pool ID #1, collection pool ID #1 is added to the data structure of the collection to associate the collection with the collection pool.

If no collections are added or after adding the metadata to the collection pool, at 212, interface generator 108 determines a ranking strategy for the collection pool. The ranking strategy may define an algorithm that is used to rank collections that are associated with the collection pool. Different ranking strategies may be used. For example, the ranking strategies may receive input and use the input to rank the respective collections. Different algorithms may include ranking collections based on the most recently watched videos, ranking collections based on the total minutes watched, ranking collections based on interactions with respective collections, etc. A different ranking strategy may rank the same set of collections differently.

At 214, interface generator 108 stores information associating the ranking strategy with the collection pool. For example, an identifier for the ranking strategy may be stored with the collection pool. Different collection pools may be associated with different ranking strategies. Also, ranking strategies may be re-used, such as multiple collection pools may use the same ranking strategy.

Figure 3:
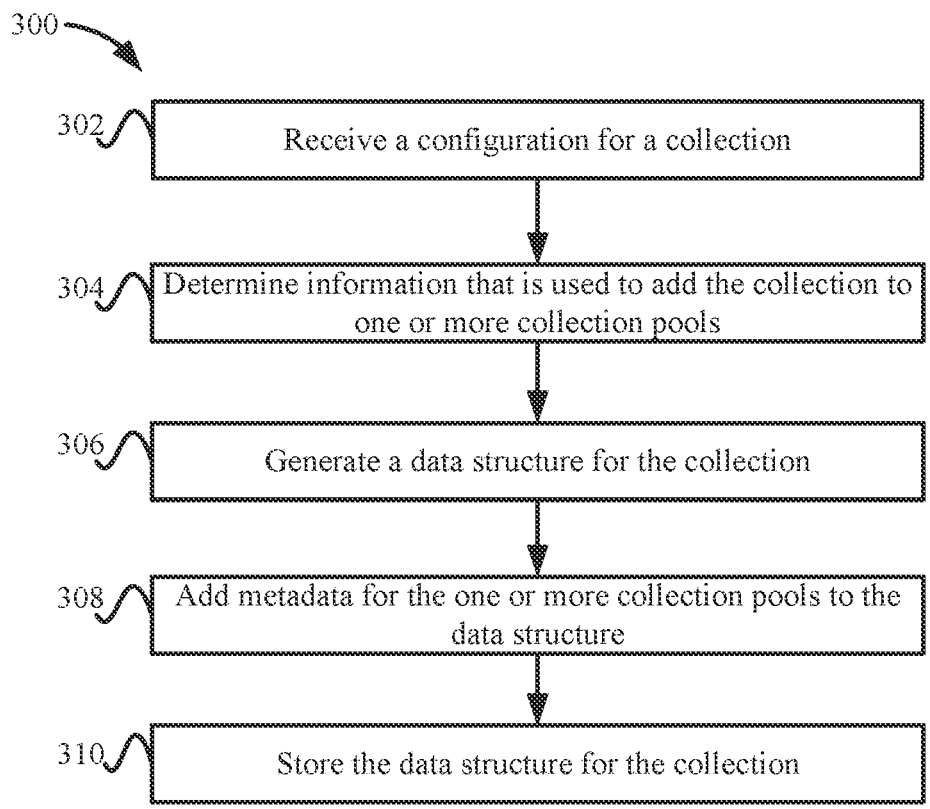
FIG. 3 depicts a simplified flowchart of a method for adding a collection to a collection pool according to some embodiments.

Collections may be added to collection pools in other ways than that described above. For example, an individual collection may be configured and added to a collection pool. FIG. 3 depicts a simplified flowchart 300 of a method for adding a collection to a collection pool according to some embodiments. At 302, interface generator 108 receives a configuration for a collection. The configuration may include different information for the collection, such as a title, internal title, and other information. Additionally, the configuration may define collection pools for the collection. A collection may be associated with one or more collection pools. That is, a collection may be associated with multiple collection pools or only a single collection pool.

At 304, interface generator 108 determines information to add the collection to one or more collection pools. For example, an identifier for a collection pool may be determined.

At 306, interface generator 108 generates a data structure for the collection using the configuration. The data structure may be generated upon the initialization of the collection, or an already-created collection may be updated.

At 308, interface generator 108 adds metadata for the one or more collection pools to the data structure. For example, identifiers for the collection pools are added in a field in the data structure for the collection.

At 310, interface generator 108 stores the data structure for the collection. The field in the data structure for storing identifiers for collection pools may provide the ability to associate collections with collection pools. This provides configurability at the collection level to categorize collections with collection pools. Accordingly, the ranking of a collection is abstracted from the collection itself and a collection may be in multiple collection pools. An individual collection can now be ranked differently depending on which of the collection pools it is associated. The abstraction of the ranking strategy is an improvement over the general strategy of ranking collections with a single ranking strategy. Now, a single collection may be ranked using different ranking strategies by associating the collection with different collection pools.

Once the collection pools and collections are configured, an interface may be configured.

Interface Configuration

Figure 4:
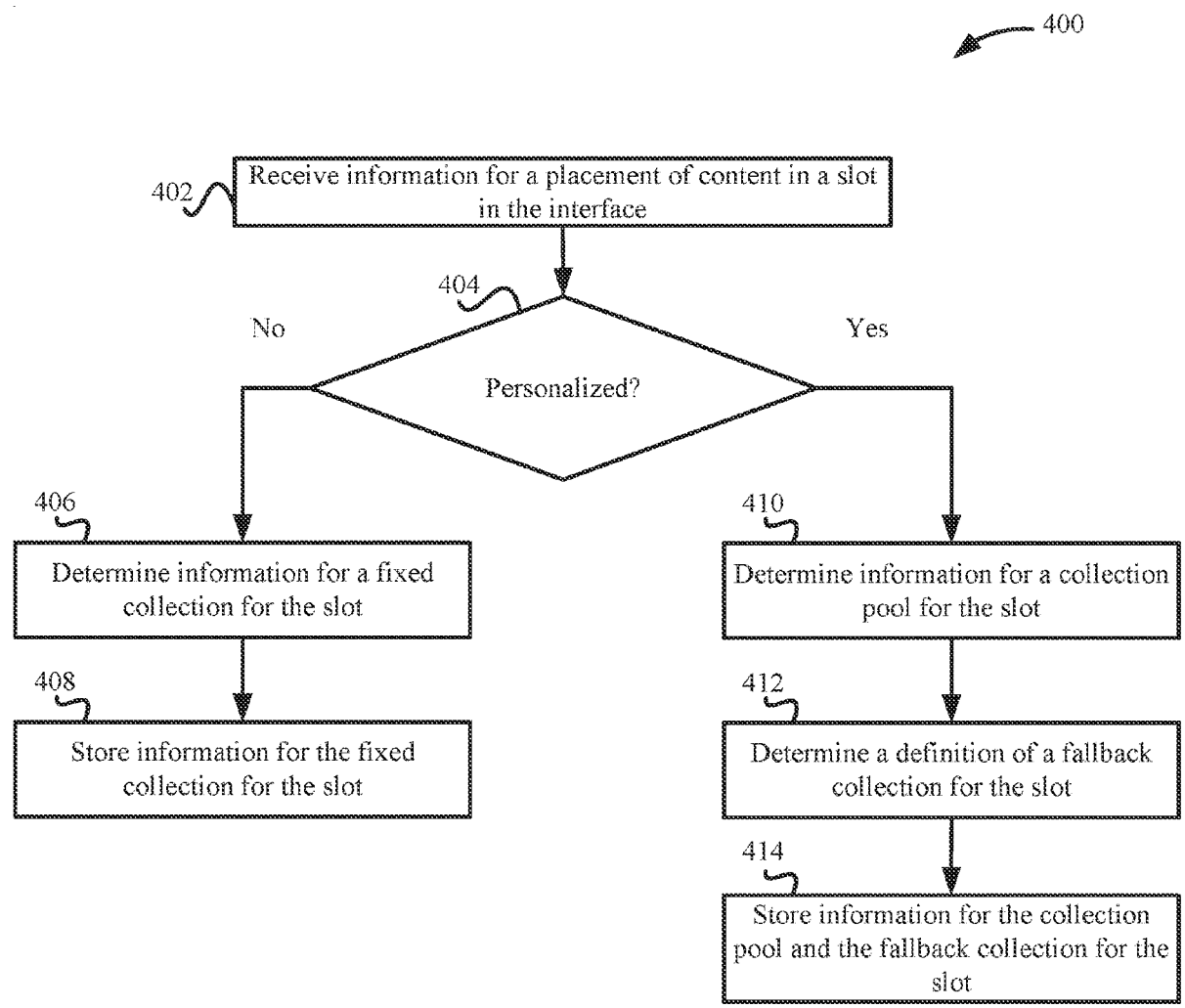
FIG. 4 depicts a simplified flowchart of configuring an interface using collection pools according to some embodiments.
Figure 5:
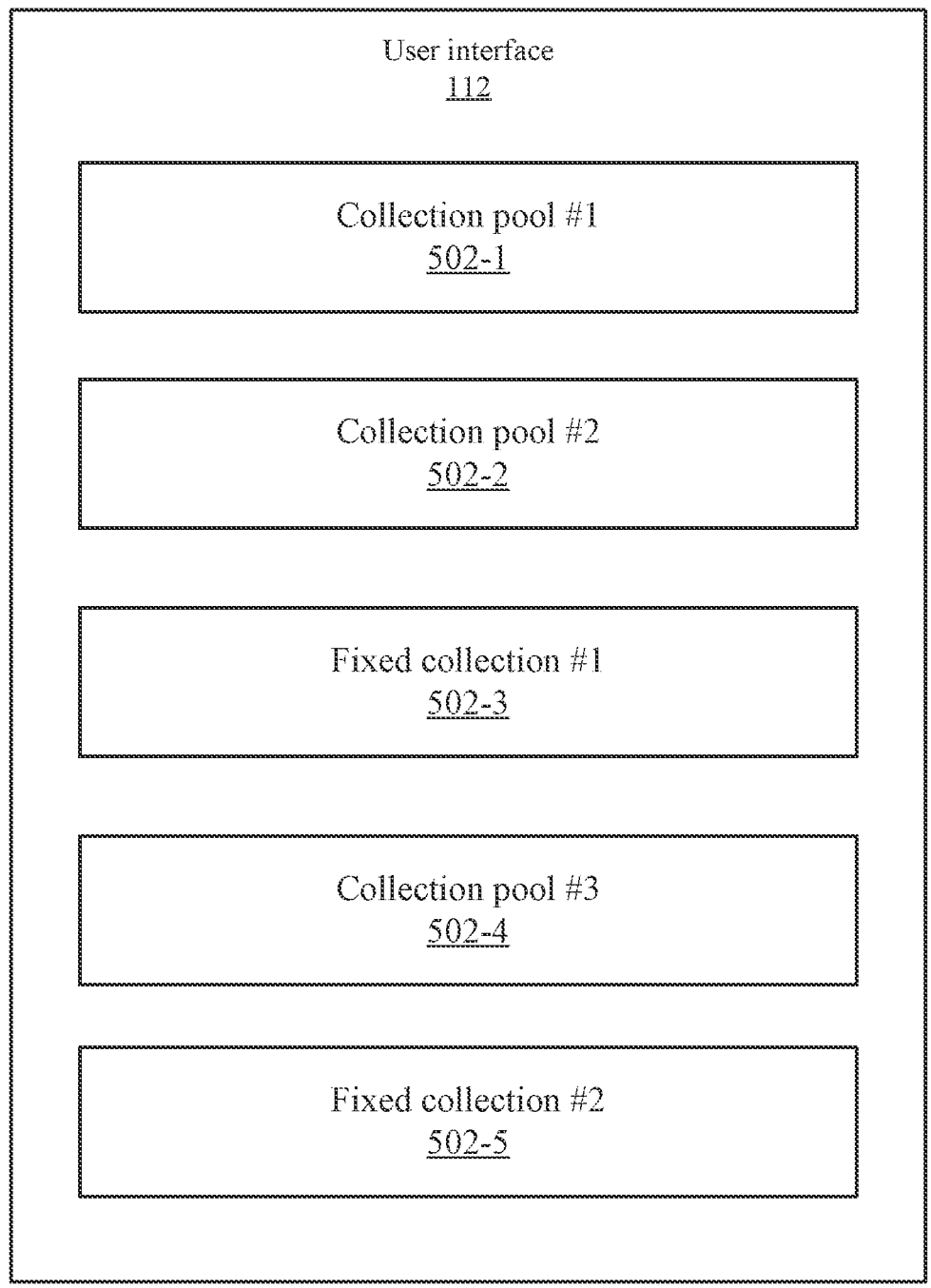
FIG. 5 depicts a simplified example of a configuration for the interface according to some embodiments.

FIG. 4 depicts a simplified flowchart of configuring an interface 112 using collection pools according to some embodiments. At 402, interface generator 108 receives information for placement of content in a slot in interface 112. The configuration of interface 112 may be based on slots, which may be portions of interface 112. FIG. 5 depicts a simplified example of a configuration for interface 112 according to some embodiments. Different slots 502-1 to 502-5 may be defined for positions on interface 112. In the configuration of interface 112, a slot may be associated with a collection pool or a fixed collection. A fixed collection may define a collection that is always displayed in the slot. A collection pool may display a personalized selection of a collection that is based on user account characteristics. The collection is selected based on a ranking strategy associated with the respective collection pool and the user account characteristics.

The configuration may define a layout of interface 112. In the configuration in FIG. 5, a slot 502-1 is associated with a collection pool #1, a slot 502-2 is associated with a collection pool #2, and a slot 502-4 is associated with a collection pool #3. Also, a slot 502-3 is associated with a fixed collection #1 and a slot 502-5 is associated with a fixed collection #2. In some embodiments, different user accounts may use different configurations of interface 112. Also, because fixed collections and collection pools are used, even if user accounts have the same configuration of slots 502 interface 112, different user accounts may receive different collections for the collection pools because the ranking strategy for collection pools may rank collections differently using different characteristics for different user accounts.

Referring back to FIG. 4, at 404, interface generator 108 determines if the configuration for a slot 502 is for a personalized collection pool. The configuration of interface 112 may include the option to designate whether a slot 502 is personalized or fixed. If the slot 502 is not personalized, the slot 502 may display a fixed collection. Then, at 406, interface generator 108 determines information for a fixed collection for the slot 502. For example, the information may be an identifier for the collection, such as a collection #1. After determining the fixed collection, at 408, interface generator 108 stores information for the fixed collection for the slot 502.

If the slot 502 is personalized, at 410, interface generator 108 determines information for a collection pool for the slot 502. When a personalized option is selected, the configuration includes information for a collection pool. The information may be a collection pool identifier, such as an identifier of collection pool #1. When using a personalized option, it is possible that the ranking of collections for a collection pool may not return any recommendations. To provide some content to display in the slot 502 when this occurs, a fallback collection may be defined. The fallback collection may not be used in other cases, and content for the slot 502 may not be displayed when no recommendation is returned. That is, the slot 502 may be removed from interface 112 and replaced by other slots 502. To determine a fallback collection, at 412, interface generator 108 determines a definition of a fallback collection for the slot 502. The fallback collection may be defined by a collection ID. In this case, if no recommendations are received for the slot 502, the fallback collection may be displayed. Other conditions may also be used to display the fallback collection, such as if a collection that is returned does not receive a recommendation score that meets a threshold. For example, if the recommendation score is not high enough, this may indicate that the collection that is determined may not be that relevant to the user account, and a fallback collection may be used instead. Then, at 414, interface generator 108 stores information for the collection pool and the fallback collection for the slot 502. For example, interface generator 108 may store an identifier for the collection pool and a collection identifier for the fallback collection for the slot 502.

Once the configuration of interface 112 is generated, interface 112 may be generated.

Interface Generation

Figure 6:
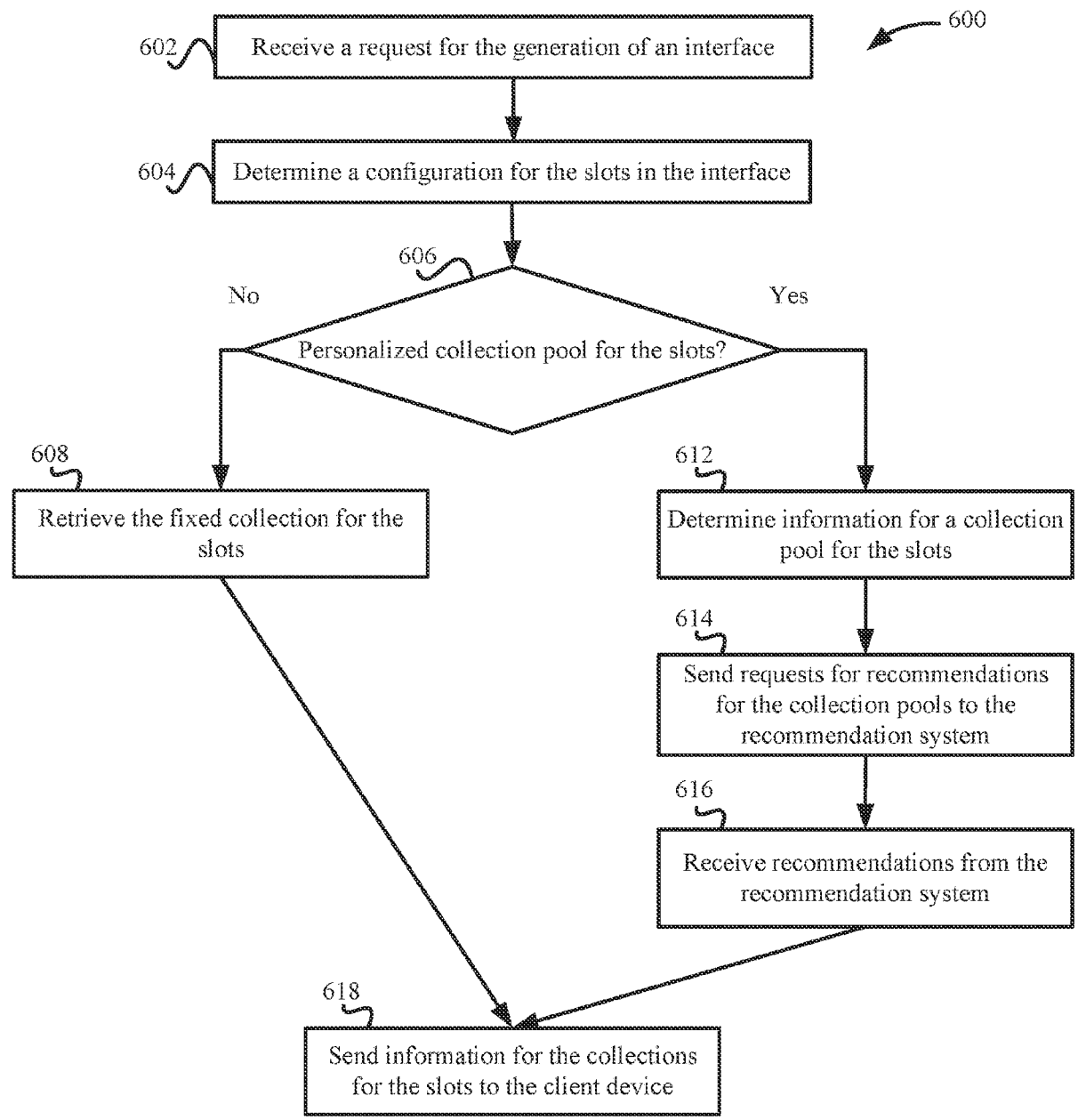
FIG. 6 depicts a simplified flowchart for generating the interface according to some embodiments.

FIG. 6 depicts a simplified flowchart 600 for generating an interface 112 according to some embodiments. At 602, interface generator 108 receives a request for generation of an instance of interface 112. For example, a log in from a user account on application 114 may be received. The generation of an instance of interface may happen at other times also. For example, interface 112 may display a new page and an interface request for content for the new page is received. In the other times, application 114 may send an interface request for updated information for interface 112. When generation of an instance of interface 112 is desired, application 114 sends an interface request to video delivery system 106.

Upon receiving the interface request, at 604, interface generator 108 determines a configuration for the slots 502 in interface 112. As discussed above, the configuration may identify collection pools or fixed collections for slots 502.

At 606, interface generator 108 determines if a personalized collection pool is defined for the slots 502. If not, at 608, interface generator 108 retrieves a fixed collection for the slot 502. For example, a data structure associated with a collection ID is retrieved. The data structure for a fixed collection may define different item identifiers, such as for videos, that can be displayed in the slot 502.

If a personalized collection pool is defined for the slot 502, at 612, interface generator 108 determines information for a collection pool for the slot 502. It is possible that unique collection pools may be associated with each slot 502 on an instance of interface 112. However, a single collection pool may be associated with multiple slots 502 on an instance of interface 112. For example, a collection pool #1 may be associated with a slot #1 and a slot #3. When this occurs, slot #1 may display a collection from collection pool #1, and slot #3 may display another collection from collection pool #1. For example, collection #1 may be the highest-ranked collection for collection pool #1 and collection #2 may be the second-highest-ranked collection for collection pool #2. This provides different collections instead of the same collection for the collection pool. The same collection pool may be used on an instance of a page for multiple slots 502 because that collection pool may be more relevant to a user account than other collection pools.

Interface generator 108 may collect the collection pools that are defined for all slots 502 on interface 112. Then, at 614, interface generator 108 sends requests for recommendations for the collection pools to recommendation system 116. The generation of recommendations by recommendation system 116 will be described in more detail below. At 616, interface generator 108 receives recommendations from recommendation system 116. The recommendations may be a single recommendation for each slot 502. In other examples, the recommendations may be a list of recommendations for each slot 502. In this case, interface generator 108 may select one of the recommendations for the slot 502. Also, interface generator 108 may be able to select the highest-ranked collection for a slot 502 or use other logic to personalize the selection from the list of ranked collections. For example, interface generator 108 may determine that the second-ranked recommendation may be better to display based on some information, such as the current activity of the user account or the other collections currently being displayed on interface 112 may indicate the second-ranked collection is better to display.

At 618, video delivery system 106 sends information for the collections for slots 502 to client device 104. For example, in either case when a fixed collection or a personalized collection is used for a slot 502, video delivery system 106 sends the information for the collections that are selected for the slots 502. In some embodiments, video delivery system 106 sends the collection identifiers. Then, application 114 can display the items for each collection that is identified. Also, video delivery system 106 may send identifiers for the items in the collection instead of the collection identifier. Application 114 may then display an instance of interface 112 using the collections.

FIG. 7 depicts an example of user interface 112 according to some embodiments. Interface 112 includes slots 502-1 to 502-5. Within each slot 502, a collection may be displayed. In slot 502-1, the highest ranked collection for collection pool #1 is displayed. Slot 502-2 was associated with collection pool #2, and the highest-ranked collection for collection pool #2 is displayed in this slot 502-2.

Slot 502-3 was associated with the same collection pool as slot 502-1, which is collection pool #1. Accordingly, instead of displaying the same collection as slot 502-1, slot 502-3 displays the second-highest ranked collection in collection pool #1. In this case, a slot 502 may be associated with multiple collection pools and different collections can be displayed automatically for the same collection pool on an instance of interface 112.

Slot 502-4 is associated with a fixed collection, and a fixed collection #1 is displayed here. Then, slot 502-5 is associated with collection pool #3, and the highest-ranked collection for collection pool #3 is displayed.

The collections that are displayed in interface 112 may be easily changed by associating slots 502 with different collection pools. Then, different collections may be ranked based upon the collections that are associated with the new collection pool using a new ranking strategy. This avoids having to reconfigure individual collections for a slot 502 when the change is desired. Rather, only the collection pool may be changed.

Recommendation Generation

Figure 8A:
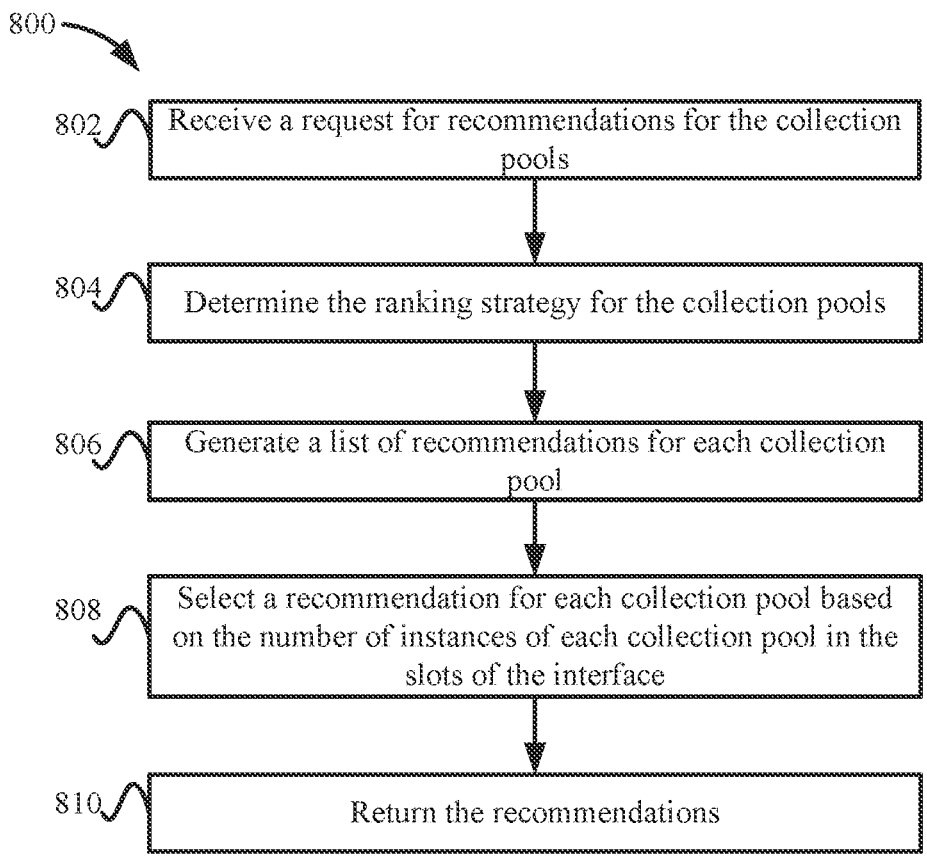
FIG. 8A depicts a simplified flowchart of a method for generating recommendations according to some embodiments.

Recommendation system 116 may use different ranking strategies that are associated with collection pools to generate recommendations. FIG. 8A depicts a simplified flowchart 800 of a method for generating recommendations according to some embodiments. At 802, recommendation system 116 receives a request for recommendations for the collection pools. In some embodiments, recommendation system 116 may receive a batch request that requests recommendations for all collection pools for slots 502 on an instance of interface 112. In other examples, recommendation system 116 may receive separate requests for collection pools that are associated with slots 502 on interface 112.

At 804, recommendation system 116 determines the ranking strategy for the collection pools. For example, the ranking strategy may be included in a configuration of each collection pool. Then, the algorithm to use for the ranking strategy may be retrieved based on the identifier for the ranking strategy.

At 806, recommendation system 116 may generate a recommendation for each collection pool. For example, recommendation system 116 may determine input for each algorithm. The input may include information that is associated with the user account that requested the instance of interface 112. The input is then input into an algorithm for each ranking strategy. The output of each algorithm may be information that can be used to determine one or more recommendations, which may be collections. For example, the output may be a list of ranked collections.

At 808, recommendation system 116 may select a recommendation for each collection pool based upon the number of instances of each collection pool in slots 502 of interface 112. In some embodiments, recommendation system 116 may determine when a collection pool identifier is associated with multiple slots 502. For example, a comparison of the collection pool identifiers for each slot 502 may be used to identify the slots 502 that have the same collection pool listed. If there is only one instance of a collection pool in interface 112, then recommendation system 116 may select one of the collections in the list, such as the highest-ranked collection. However, if a collection pool is listed for multiple slots 502, then recommendation system 116 may not select the same collection for both slots 502. For example, recommendation system 116 may select the highest-ranked collection for one slot 502 that may be displayed in a higher priority position, such as higher in interface 112, and the second-ranked collection for a slot 502 that is in a lower priority position, such as lower in interface 112. Other methods of selecting different collections for a collection pool that is included in multiple slots 502 may also be used. However, recommendation system 116 may not return the same collection for a collection pool that is listed in multiple slots 502.

At 810, recommendation system 116 returns the recommendations. As discussed above, the recommendations may return a single collection for each slot 502. In other embodiments, the list of recommendations for each slot 502 may be returned to interface generator 108, and interface generator 108 may select the collections from the lists using logic that recommendation system 116 used as described above. The functions as described with respect to recommendation system 116 and interface generator 108 may be distributed in different ways.

Interface generator 108 may perform a check on whether the collection returned from recommendation system 116 is associated with the collection pool. In some cases, the collection may not be associated with the collection pool that is assigned to the slot 502. This situation may arise if the collection is removed from a collection pool, but a change is not yet propagated to recommendation system 116. In some embodiments, recommendations may change on a slower pace, and the database used by recommendation system 116 may be updated offline, such as every ten minutes, hour, day, etc. In some cases, if a configuration change to remove a collection from a collection pool occurs, the change has not yet propagated to recommendation system 116. However, interface generator 108 may perform the check to ensure that a collection for the collection pool may be displayed. If the collection is not part of the collection pool, then interface generator 108 may not use the collection. For example, a different collection may be selected, or the collection pool may not be displayed in the slot 502. Rather, the fallback option may be displayed, or the slot 502 may be removed from interface 112.

Figure 8B:
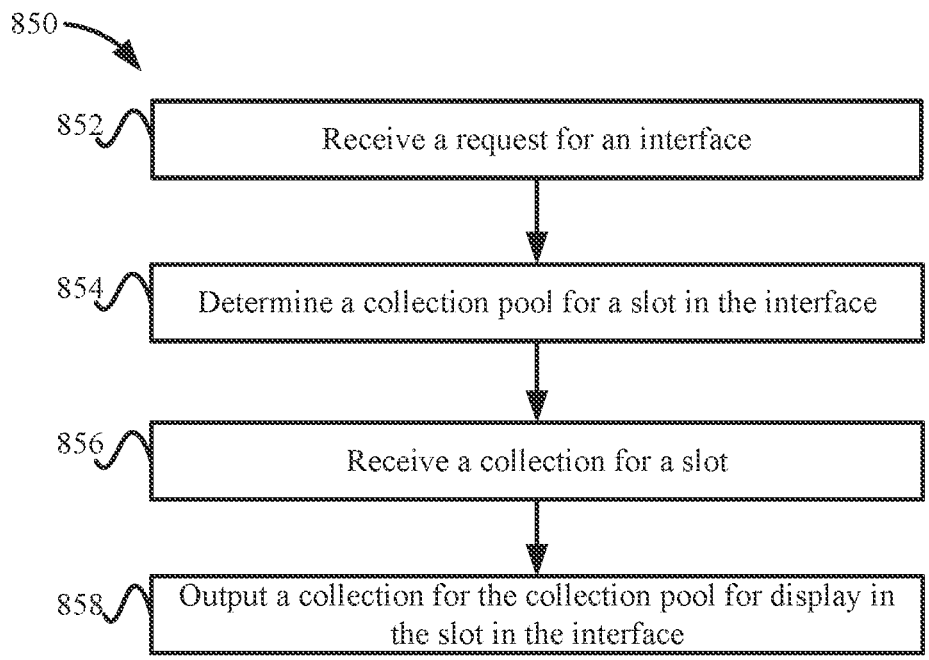
FIG. 8B depicts a simplified flowchart for processing a request for an interface according to some embodiments.

FIG. 8B depicts a simplified flowchart 850 for processing a request for an interface according to some embodiments. At 852, interface generator 108 receives a request for interface 112. Interface requests may be for an instance of interface 112 and may be received based on different conditions. For example, interface 112 may display a new page and an interface request for content for the new page is received. Interface generator 108 may determine a configuration for the interface that includes a plurality of slots that are associated with a plurality of collection pools. Each collection pool is configurable with a ranking strategy.

At 854, interface generator 108 determines a collection pool for a slot in the interface. The collection pool is associated with a plurality of collections. The collections may be different groupings of items, such as videos. Interface generator 108 determines the collections based on an association of the collection pool to the collections, such as the collections have been identified as being part of the collection pool.

At 856, interface generator 108 receives a collection for the slot. The collection may be determined by ranking the plurality of collections using a ranking strategy for the collection pool to generate a ranking of the plurality of collections. The collection pool may be associated with a ranking strategy. Information for the collections may be input into an algorithm for the ranking strategy to generate the ranking of the collections. A collection is then selected from the ranking, such as the highest ranked collection may be selected.

At 858, interface generator 108 outputs the collection for the collection pool for display in the slot of the interface. For example, interface generator 108 sends information for the collection to client device 104. Application 114 may display the collection in the slot in interface 112. For example, items for the collection are displayed in the slot and can be browsed by a user account. A selection of one of the items, such as a video, may cause playback of the video to start.

Accordingly, for a given user account, the most relevant collections are displayed for each slot 502. The most relevant collections may be displayed because ranking strategies for each collection pool may be defined, which may provide an optimal ranking of collections for a collection pool. Also, the ranking strategy may be changed for a collection pool to optimize the selection of collections. For example, a ranking strategy may be updated based on feedback from users that view the collection that is returned for a collection pool. This allows video delivery system 106 to update and refine the ranking strategy for a specific collection pool instead of the entire universe of collections that are available. The collection pool for a slot 502 may also be changed to optimize the collection that may be displayed in a slot 502. For example, if feedback indicates a collection pool is not performing optimally when displayed, a different collection pool may be associated with the slot 502. This would provide different collections that are eligible to be displayed in the slot 502. The reconfiguration may be performed by changing the collection pool identifier for the slot 502, which is a fast and efficient reconfiguration.

System

Figure 9:
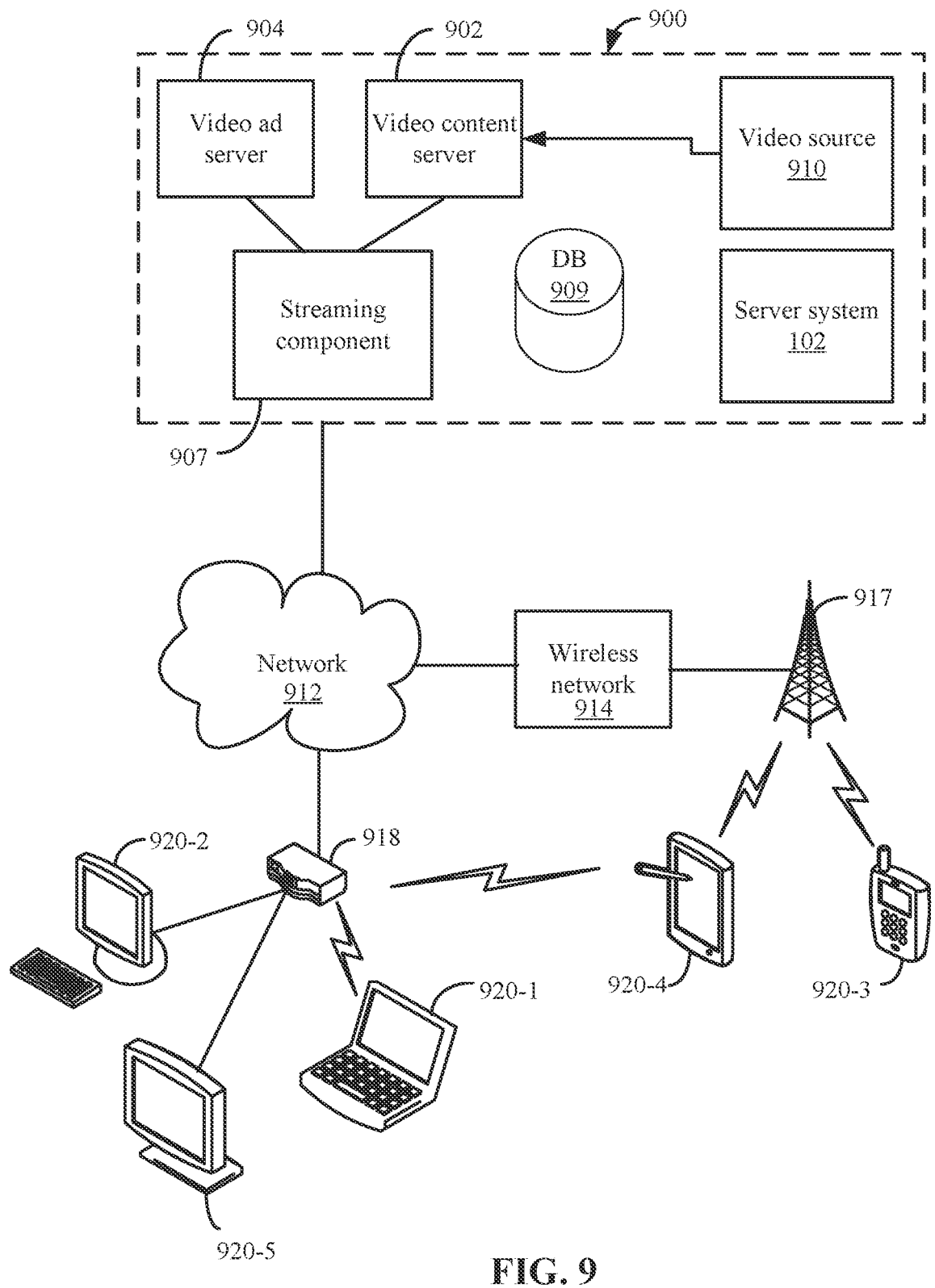
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264 / Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 also may include server system 102.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912, wireless cellular telecommunications network 914, and/or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless cellular telecommunications network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HyperText Transfer Protocol (HTTP) and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
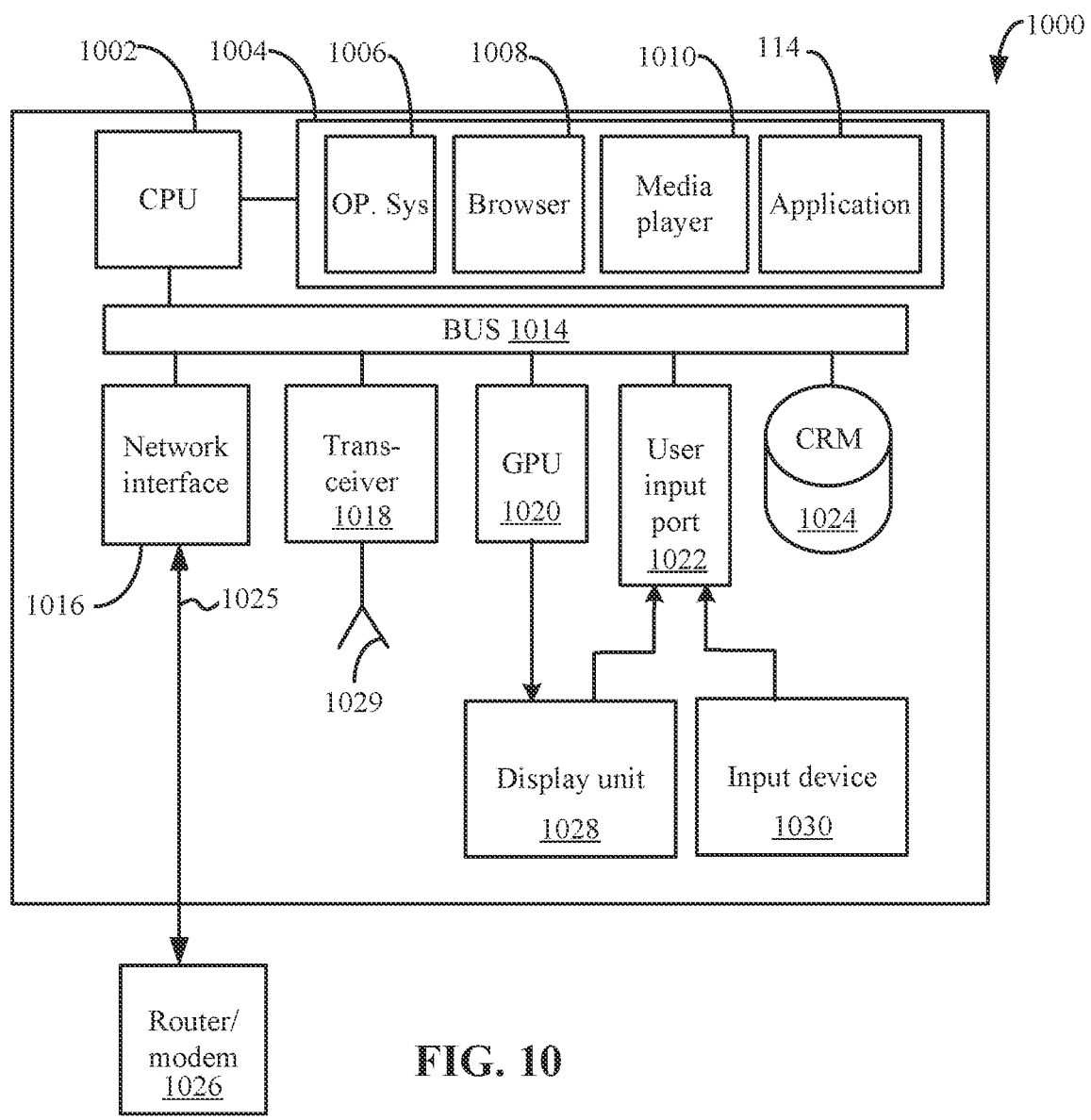
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The modules may further include interface 112. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules 1006, 1008, 1010 and 1012 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Example Embodiments

In some embodiments, a method comprising: receiving, by a computing device, a request for an interface, wherein a configuration for the interface includes a plurality of slots that are associated with a plurality of collection pools, wherein each collection pool is configurable with a ranking strategy; determining, by the computing device, a collection pool for a slot in the interface, wherein the collection pool is associated with a plurality of collections; receiving, by the computing device, a collection for the slot, wherein the collection is determined by ranking the plurality of collections using a ranking strategy for the collection pool to generate a ranking of the plurality of collections; and outputting, by the computing device, the collection for the collection pool for display in the slot of the interface.

In some embodiments, the method further comprising: configuring collection pools in the plurality of collection pools with different ranking strategies, wherein the different ranking strategies include different algorithms for ranking collections.

In some embodiments, the method further comprising: associating a collection with a configuration of a collection pool in the plurality of collection pools based on receiving input adding the collection to the collection pool.

In some embodiments, associating the collection with the collection pool comprises: adding an identifier for the collection pool to a data structure for the collection.

In some embodiments, the method further comprising: configuring a collection with an association to a collection pool; and adding the association to the collection to a data structure for the collection.

In some embodiments, the method further comprising: receiving a definition of a fixed collection for a slot in the plurality of slots, wherein the slot always displays a same collection.

In some embodiments, the method further comprising: receiving a definition of a collection pool in the plurality of collection pools that is personalized for a slot in the plurality of slots, wherein the slot displays a collection that is ranked based on a ranking strategy for the collection pool.

In some embodiments, the method further comprising: receiving a fallback option for a collection pool in the plurality of collection pools, wherein the fallback option defines a collection to display if a collection is not received that meets a condition.

In some embodiments, at least two slots in the plurality of slots are associated with the same collection pool, and different collections are displayed in the least two slots based on the ranking strategy for the collection pool.

In some embodiments, a first slot in the at least two slots displays a first collection, and a second slot in the at least two slots displays a second collection, wherein the first collection is ranked higher than the second collection.

In some embodiments, the method further comprising: sending a request for recommendations for the plurality of collection pools; and receiving a collection for each of the plurality of collection pools.

In some embodiments, the method further comprising: sending a request for recommendations for the plurality of collection pools; and receiving a ranking of collections for each of the plurality of collection pools.

In some embodiments, the method further comprising: determining whether a collection for a slot is associated with the collection pool, wherein if the collection is not associated with the collection pool, not outputting the collection for the collection pool for display in the slot.

In some embodiments, the method further comprising: determining the plurality of collections for the collection pool based on identification information for the collection pool being stored with each of the plurality of collections; ranking the plurality of collections based on information for a user account; and using the ranking to select a collection for the collection pool.

In some embodiments, a non-transitory computer-readable storage medium containing instructions, that when executed, control a computer system to be operable for: receiving a request for an interface, wherein a configuration for the interface includes a plurality of slots that are associated with a plurality of collection pools, wherein each collection pool is configurable with a ranking strategy; determining a collection pool for a slot in the interface, wherein the collection pool is associated with a plurality of collections; receiving a collection for the slot, wherein the collection is determined by ranking the plurality of collections using a ranking strategy for the collection pool to generate a ranking of the plurality of collections; and outputting the collection for the collection pool for display in the slot of the interface.

In some embodiments, a method comprising: receiving, by a computing device, a collection pool for a slot in an interface; determining, by the computing device, a ranking strategy for the collection pool; selecting, by the computing device, a plurality of collections that are associated with the collection pool, wherein each collection includes one or more items; ranking, by the computing device, the plurality of collections using the ranking strategy to generate a ranked plurality of collections; and outputting, by the computing device, a collection for the slot based on the ranked plurality of collections.

In some embodiments, the method further comprising: receiving a plurality of collection pools for a plurality of slots in the interface, wherein at least two collection pools in the plurality of collection pools include a different ranking strategy and different collections that are ranked for the at least two collection pools.

In some embodiments, at least two slots in the plurality of slots are associated with the same collection pool, and at least two different collections are selected for the at least two slots.

In some embodiments, the method further comprising: generating a ranking of collections for each of the plurality of collection pools.

In some embodiments, selecting the plurality of collections comprises: determining collections that are associated with the collection pool from available collections for all collection pools in the plurality of collection pools.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving, by a computing device, a request for an interface, wherein a configuration for the interface includes a plurality of slots that are associated with a plurality of collection pools, wherein each collection pool is configurable with a ranking strategy for ranking collections;
for each slot in the plurality of slots, performing:
determining, by the computing device, a collection pool for a slot in the interface, wherein the collection pool is associated with a plurality of collections, wherein collections in the plurality of collections are eligible to be displayed in the slot; and
receiving, by the computing device, a collection for the slot, wherein the collection is determined by ranking the plurality of collections using a ranking strategy for the collection pool to generate a ranking of the plurality of collections, and wherein the collection is associated with one or more items; and
outputting, by the computing device, the respective collection for the respective collection pool for display in each slot in the plurality of slots of the interface, wherein the one or more items for the respective collections is displayable in the respective slot of the interface.

2. The method of claim 1, further comprising:
configuring collection pools in the plurality of collection pools with different ranking strategies, wherein the different ranking strategies include different algorithms for ranking collections.

3. The method of claim 1, further comprising:
associating a collection with a configuration of a collection pool in the plurality of collection pools based on receiving input adding the collection to the collection pool.

4. The method of claim 3, wherein associating the collection with the collection pool comprises:
adding an identifier for the collection pool to a data structure for the collection.

5. The method of claim 1, further comprising:
configuring a collection with an association to a collection pool; and
adding the association to the collection to a data structure for the collection.

6. The method of claim 1, further comprising:
receiving a definition of a fixed collection for a slot in the plurality of slots, wherein the slot always displays a same collection.

7. The method of claim 1, further comprising:
receiving a definition of a collection pool in the plurality of collection pools that is personalized for a slot in the plurality of slots, wherein the slot displays a collection that is ranked based on a ranking strategy for the collection pool.

8. The method of claim 1, further comprising:
receiving a fallback option for a collection pool in the plurality of collection pools, wherein the fallback option defines a collection to display if a collection is not received that meets a condition.

9. The method of claim 1, wherein:
at least two slots in the plurality of slots are associated with the same collection pool, and
different collections are displayed in the least two slots based on the ranking strategy for the collection pool.

10. The method of claim 9, wherein:
a first slot in the at least two slots displays a first collection, and
a second slot in the at least two slots displays a second collection, wherein the first collection is ranked higher than the second collection.

11. The method of claim 1, further comprising:
sending a request for recommendations for the plurality of collection pools; and
receiving an identification of a collection for each of the plurality of collection pools.

12. The method of claim 1, further comprising:
sending a request for recommendations for the plurality of collection pools; and
receiving a ranking of collections for each of the plurality of collection pools.

13. The method of claim 1, further comprising:
determining whether a collection for a slot is associated with the collection pool, wherein if the collection is not associated with the collection pool, not outputting the collection for the collection pool for display in the slot.

14. The method of claim 1, further comprising:
determining the plurality of collections for the collection pool based on identification information for the collection pool being stored with each of the plurality of collections;
ranking the plurality of collections based on information for a user account; and
using the ranking to select a collection for the collection pool.

15. A non-transitory computer-readable storage medium containing instructions, that when executed, control a computer system to be operable for:

receiving a request for an interface, wherein a configuration for the interface includes a plurality of slots that are associated with a plurality of collection pools, wherein each collection pool is configurable with a ranking strategy for ranking collections;

for each slot in the plurality of slots, performing:

determining a collection pool for a slot in the interface, wherein the collection pool is associated with a plurality of collections, wherein collections in the plurality of collections are eligible to be displayed in the slot; and receiving a collection for the slot, wherein the collection is determined by ranking the plurality of collections using a ranking strategy for the collection pool to generate a ranking of the plurality of collections, and wherein the collection is associated with one or more items; and outputting the respective collection for the respective collection pool for display in each slot in the plurality of slots of the interface, wherein the one or more items for the respective collections is displayable in the respective slot of the interface.

16. A method comprising:

receiving, by a computing device, a respective collection pool for a plurality of slots in an interface;

for each slot in the plurality of slots, performing:

determining, by the computing device, a ranking strategy for the collection pool;

selecting, by the computing device, a plurality of collections that are associated with the collection pool, wherein collections in the plurality of collections are eligible to be displayed in the slot, and wherein each collection includes one or more items;

ranking, by the computing device, the plurality of collections using the ranking strategy to generate a ranked plurality of collections; and outputting, by the computing device, a collection for the slot based on the ranked plurality of collections, wherein the one or more items for the collection is displayable in the respective slot of the interface.

17. The method of claim 16, further comprising:

receiving a plurality of collection pools for a plurality of slots in the interface, wherein at least two collection pools in the plurality of collection pools include a different ranking strategy and different collections that are ranked for the at least two collection pools.

18. The method of claim 17, wherein:

at least two slots in the plurality of slots are associated with the same collection pool, and at least two different collections are selected for the at least two slots.

19. The method of claim 17, further comprising:

generating a ranking of collections for each of the plurality of collection pools.

20. The method of claim 16, wherein selecting the plurality of collections comprises:

determining collections that are associated with the collection pool from available collections.

* * * * *